Sept. 21, 1965  E. M. SCHLUSSLER  3,206,836
METHOD OF MANUFACTURING WATER COOLED EXHAUST MANIFOLDS
Filed Oct. 17, 1961  3 Sheets-Sheet 1

EDWARD M. SCHLUSSLER
*INVENTOR.*

BY *Myer A. Barkin*

ATTORNEY

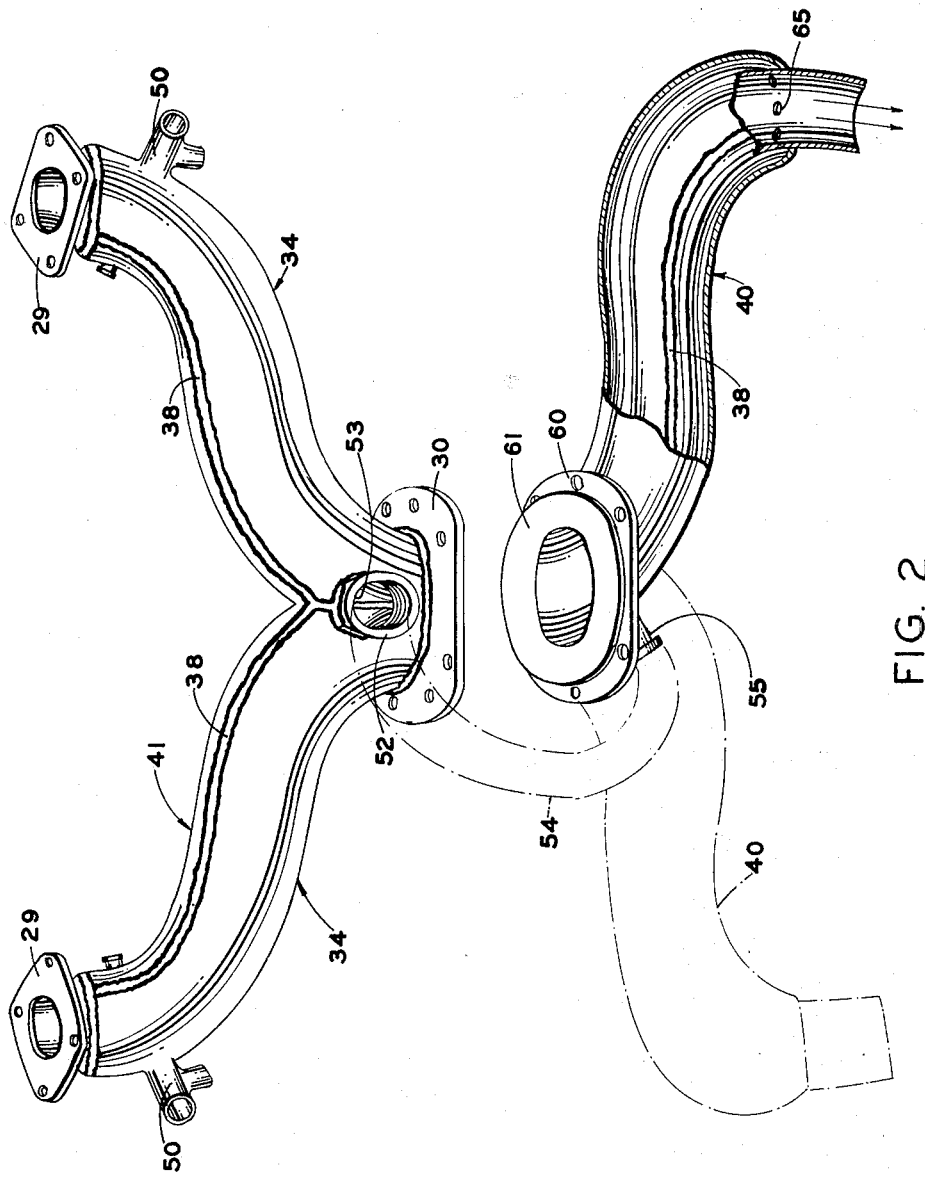

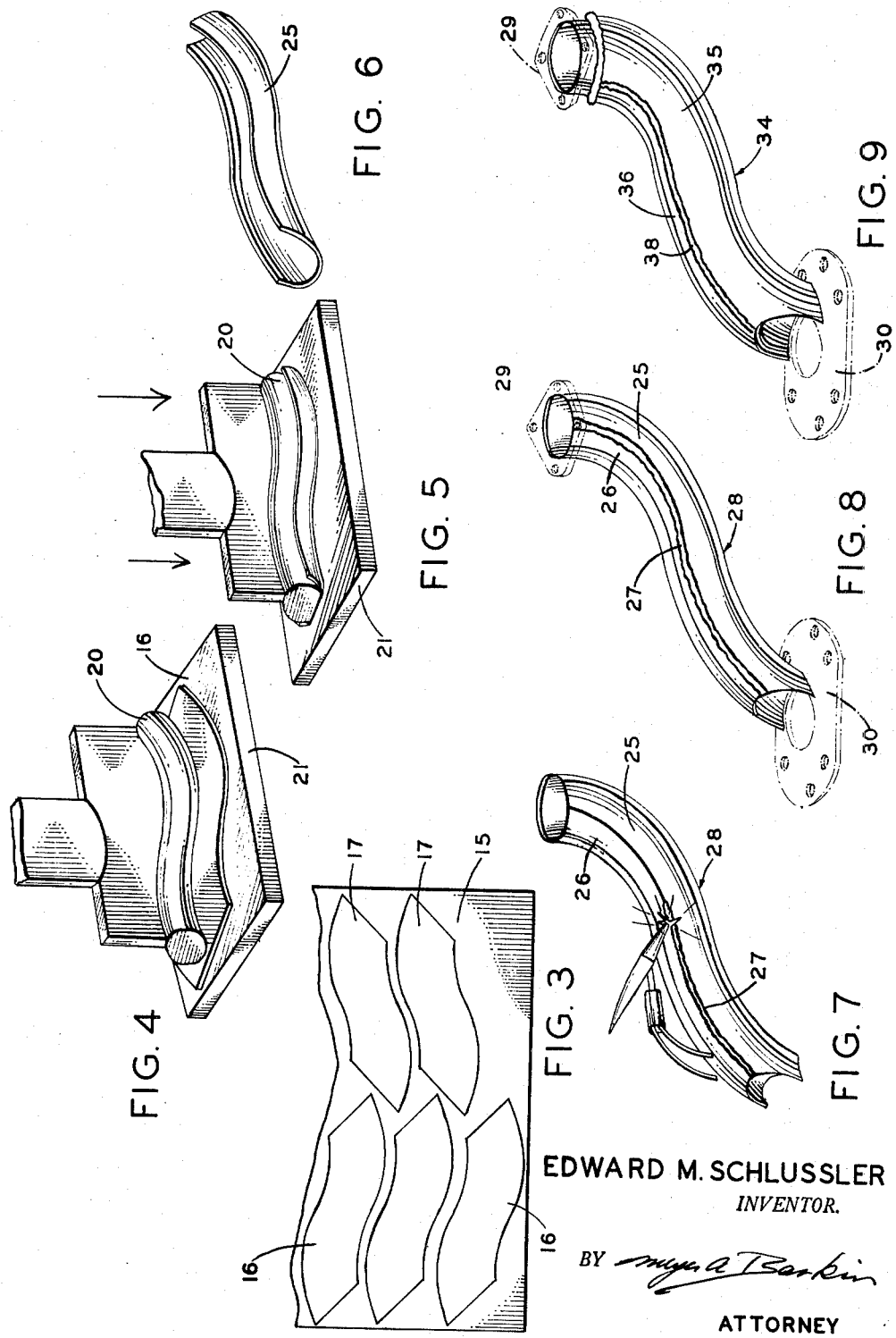
EDWARD M. SCHLUSSLER
INVENTOR.
BY *Myra A Barkin*
ATTORNEY

United States Patent Office 3,206,836
Patented Sept. 21, 1965

3,206,836
METHOD OF MANUFACTURING WATER COOLED EXHAUST MANIFOLDS
Edward M. Schlussler, 1243 20th St., Miami Beach, Fla.
Filed Oct. 17, 1961, Ser. No. 147,418
2 Claims. (Cl. 29—157)

This invention relates to a method of manufacturing water cooled marine exhaust manifolds.

Most water jacketed exhaust manifolds have been produced in the past by the well-known method of taking a straight piece of hollow tubing which is to form the inner tube of the manifold and fixing it by welding or brazing at one end to suitable bracket type mounting members. The outer tube is then telescoped over the inner tube leaving the desired space between the inner and outer tubes, and the area there between is filled with molten resin. The resin is then permitted to cool and set. The telescoped tubes are then subjected to whatever bending is required to attain the desired shapes, which are generally curved in various degrees. After the bending takes place the resin is heated, melted and drained out of the space between the inner and outer shell. This bending operation results in a drawing of the metal at the curved portions which thins it out considerably along the outside arc of the curve. The metal is stretched during the bending operation with the result that one area of the manifold is of a certain thickness and the outer portions of the arc at which the bend has taken place become considerably thinner. This commonly results in "blow outs" at these thinned portions and it is then necessary to repair the blown out portions by expensive welding operations and more often it is necessary to discard and replace the entire manifold.

The improved process disclosed herein, which is applicant's invention, eliminates this undesirable thinning of the metal of the tube and consequently results in a manifold which has the same thickness and strength throughout and eliminates entirely the use of the old resin method.

It is a principal object of this invention to provide an improved method of manufacturing water cooled marine exhaust manifolds.

Another object of this invention is to provide a method of manufacturing a water cooled marine exhaust manifold wherein the thickness of the inner and outer layers of the water jacket are constant throughout the length of the tube, regardless of the curvatures in the contour and other variations in shape.

Another object of this invention is to provide an improved method of manufacturing a water cooled marine exhaust manifold which greatly reduces the cost of manufacturing and provides a manifold of better quality, durability and which is substantially blow-out proof throughout the length of the manifold, regardless of variations in the contour and curvatures.

Still another object of this invention is to provide in a water cooled marine exhaust manifold an arrangement of parts which permits swiveling of the end piece of the manifold to readily accommodate various positions of the outlet discharge end, and so facilitate ease of mounting in a boat hull.

Other objects and advantages of the improved method of this invention and the product resulting therefrom will readily become apparent from a reading of the following detailed description in connection with the accompanying drawings in which:

FIG. 2 is another perspective exploded view of a marine exhaust manifold made in accordance with this invention, partially in cross section, illustrating in broken lines an alternative position to which the end piece may be swiveled.

FIG. 3 illustrates a portion of a sheet of material on which right and left blank segments of irregular shape have been laid out in a pattern from which they will be cut from the sheet.

FIG. 4 is a diagrammatic illustration of a die assembly in the first position of the forming operation illustrating the blank to be formed lying flat between the male and female portions of the die.

FIG. 5 is a diagrammatic view illustrating the second step of the forming operation wherein the male portion of the die has moved downwardly to press the blank into the female portion of the die.

FIG. 6 is a perspective view of a finished curved manifold section which forms one-half of the manifold shell.

FIG. 7 illustrates the welding operation by which two curved half shells, such as illustrated in FIG. 6, are seam welded together to form a completed curved tube.

FIG. 8 illustrates the next step of the method wherein the completed curved tubular section is welded or brazed to the external mounting flanges at each end of the inner tube.

FIG. 9 illustrates the completed water cooled manifold after the outer tubular section, which has been formed in two parts, in the same manner as the inner tube section, has been welded around the inner tube in spaced relation thereto.

Figure 1:
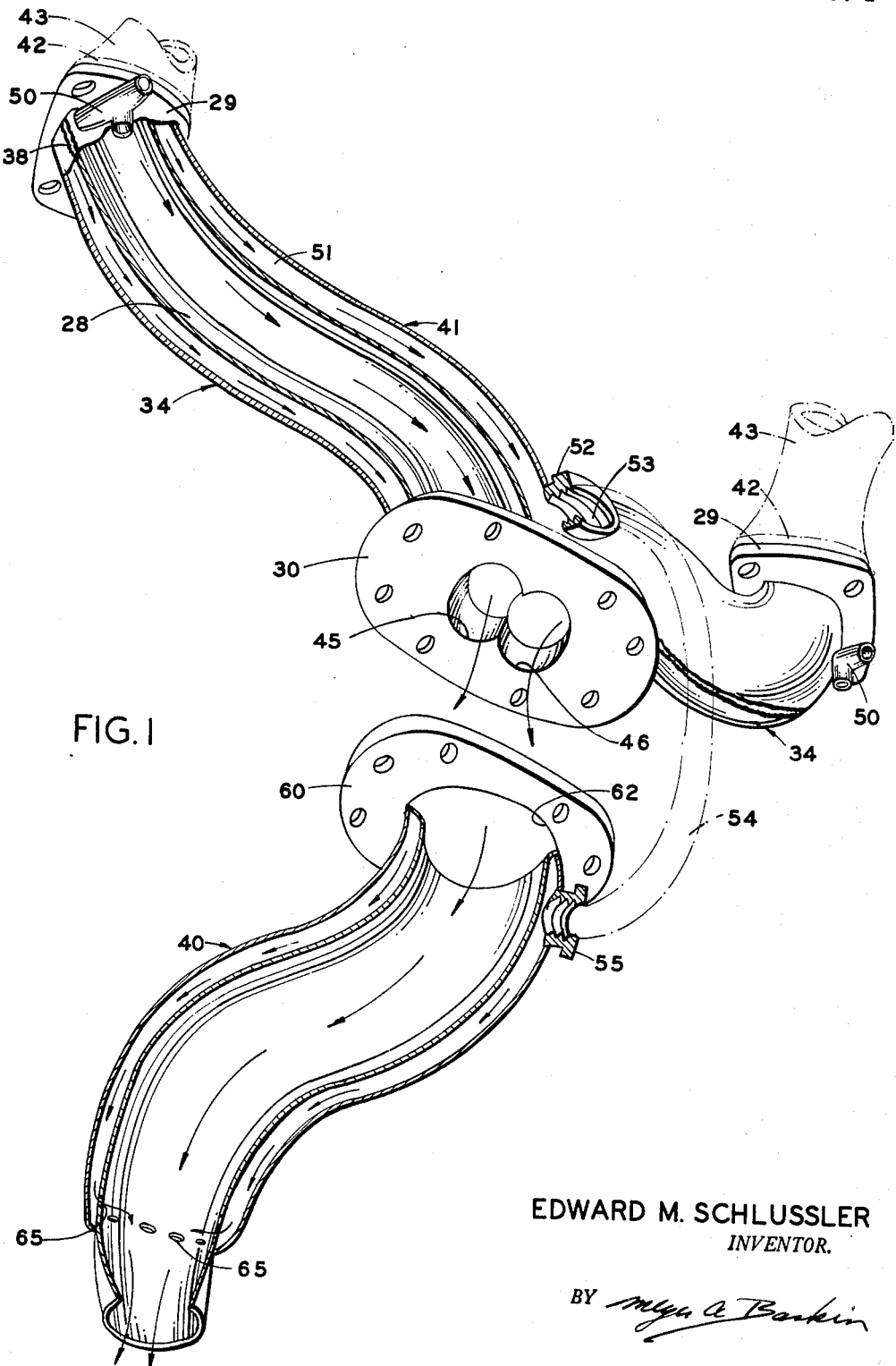
FIG. 1 is a perspective exploded view, partially in cross section, of a completed water cooled marine exhaust manifold manufactured in accordance with this invention illustrating the swivel arrangement by which the end discharge portion is connected to the main portion of the manifold.

Referring now to the drawings in detail in which like numerals indicate like parts throughout the several views, it is noted that a blank sheet 15 of material, generally copper, has had laid out on its surface a series of the desired irregular curved shapes, which are to become the manifold tube, by means of a pre-determined pattern in a series of two rows, one of "rights" indicated by the numeral 16 and one of "lefts" indicated by the numeral 17. These are outlined by any suitable marker about the outer edges of a pattern and the operator then shears the "right" blanks 16 and the "left" blanks 17 from the sheet 15. These are arranged in a manner to provide the least waste of material.

In FIG. 4 there is shown an upper male die member 20 which is shaped in the desired contour, which is similar to the outline of the blank 16. The shape of the die member 20 is pre-determined to produce the desired curved section of manifold. A "right" blank 16 is placed on the lower female die bed 21. This lower female member 21 is cut out or formed as a mold in an identical contour to the upper male portion 20 of the die, but is slightly larger, and, as shown in FIG. 5, when the upper male member of the die is moved downwardly in the direction indicated by the arrow, it presses the blank 16 into the female member and thus forms the desired curved section 25, as shown in FIG. 6.

It is to be particularly noted that this method of forming results in the curved section or shell 25 being of identical and uniform thickness throughout since there is no extreme drawing of the metal.

A similar curved section or shell 26, as shown in FIG. 7, is formed from one of the "left" blanks 17 by the same forming method. Thus, we have two halves 25 and 26 which are next joined together by a conventional seam weld 27 as shown in FIG. 7 to form the desired curved tubular shape 28.

We thus have provided an inner tube of the desired curvature for the marine exhaust manifold which has walls of the same constant and uniform thickness throughout, including the outer arc portions of the curves.

This inner tube 28 is next welded or brazed, as the next step in this process, at its ends, to the mounting bracket 29 at one end and to the center mounting bracket 30 at the other end, as shown in FIG. 8.

The next step of this invention, in producing the water cooled marine exhaust manifold, consists in making the outer tube 34, by forming two right and left shells and seam welding them together exactly in the same manner as the inner tube 28 was formed. The outer tube 34, which is larger than the inner tube 28, is comprised of the half shells 35 and 36 which are seam welded at 38 surrounding the inner tube 28. The outer shells 35 and 36 are of the same contour as the inner shells 25 and 26 which make up the inner tube 28 and each of the half shells 35 and 36 are placed around the inner tube 28 and welded or brazed at their ends to the mounting bracket 29 at one end, and to the center mounting bracket 30 at the other end, and are then seam welded together at 38 after they are placed in position to surround the inner tube 28 as shown in FIG. 9. This leaves the desired predetermined space between the inner and outer tubes through which the water coolant may flow.

A water cooled marine exhaust manifold made in accordance with the method just described is shown in perspective in FIGS. 1 and 2, portions being broken away to illustrate certain parts more clearly and the tail or end piece 40 is shown in exploded relation to the main cross piece 41. It is noted that this particular assembly is designed for use with a V-8 marine engine. The entire cross member 41 being made up of a pair of two similar sections 34 which are suitably welded together to the center mounting flange 30. The outer ends of each of the water jacketed tubes 34 which comprise the cross member 41 are welded to the mounting plates 29 as has been previously described. Each of the mounting plates is suitably bolted or fastened to a mounting flange 42 of the exhaust manifold 43 of the engine, and they are shown in dotted lines. One exhaust manifold serves the right bank of cylinders of the V-8 engine and the other accommodates the left bank of cylinders. The exhaust gases flow, completely sealed, through the inner tube 28, from the exhaust manifold mounted on the engine block, in the direction indicated by the arrows and then on through openings 45 and 46 which are formed in the center flange 30 to which the inner ends of the water jacketed manifold sections 34 have been welded.

Suitable conventional water hose fittings 50 are mounted in any suitable manner at the extreme ends of each of the manifolds, adjacent the end flanges 29, to receive the water which serves as the coolant and direct its flow into the space 51 formed between the inner tube 28 and outer tube 34. This water flows in the direction indicated by the arrows through the space 51, which surrounds the inner tube 28 and outwardly through a suitable hose connection fitting 52 which is operatively mounted at the center of the cross manifold 41. Water is discharged into the opening 53 of the hose connector fitting 52 from both right and left manifolds and is conducted through a flexible hose 54, which connects with a suitably mounted water hose connection fitting 55, provided in the tail or end piece 40 of the complete manifold assembly illustrated in FIGS. 1 and 2.

The tail end piece 40 is a water jacketed manifold formed in accordance with the teachings of this invention exactly as the water jacketed cross manifolds 34 have been formed, being welded at 38.

This tail end member 40 is joined through a swivel connection to a center mounting flange 60 which is adapted to be connected with the center mounting flange 30, in any suitable water tight manner. The swivel connection is made by use of a flared flange 61 which is fixed to the outer tube of the water jacketed end piece 40, which passes through a hole 62 in the mounting flange 60 and is rotatable therein. It is thus apparent that the tail end piece 40 may be swiveled in an arc of 180 degrees, as illustrated in FIG. 2, to permit ready directional adjustment in connection with the opening provided for the tail piece of the exhaust manifold in the hull of a boat. This feature is very desirable in permitting ready accommodation to various size transoms and engine hatches.

The water which flows through the jacket of the end piece of the manifold, as indicated by the arrows, is discharged finally through a series of spray jet holes 65 formed in the sides of the inner tube of the tail end piece of water jacketed manifold 40 so that the water which has done the cooling is ejected into the inner tube and discharged from the manifold, together with the combustion gases of the engine, overboard.

What is claimed:

1. The method of manufacturing curved water cooled marine exhaust manifolds comprising, laying out the outline of a pattern of the desired curved shape on a flat sheet of metal, cutting the blank pattern from the sheet, forming a lengthwise extending arcuate half shell from said blank by a die pressing operation adapted to maintain the thickness of the arcuate half shell constant throughout its entire length, forming a second curved blank of identical conformation into a complementary lengthwise extending arcuate half shell, placing the two half shells together with their outer edges in contact and welding said edges together throughout their length to form a leakproof curved inner tube for the exhaust gases of a water cooled manifold, forming two larger half shells conforming in shape and contour to the first named half shells said second half shells also formed in a manner to produce a half shell of constant thickness throughout its entire length, placing said larger second half shells together with their edges in contact surrounding the first formed inner tube and welding them together to form a larger outer water jacket tube, welding the extreme end edges of the inner exhaust gas tube and the end edges of outer surrounding water jacket tube to a mounting bracket in a manner whereby the inner and outer tubes will be equally spaced apart to form a passage therebetween for the water coolant surrounding the inner exhaust tube.

2. The method of manufacturing water cooled marine exhaust manifolds comprising laying out, by means of a pattern, a series of curved blanks, some formed as lefts and some formed as rights, in a manner to complement each other, cutting said right and left blanks from the sheet of metal, forming said blanks into lengthwise extending arcuately shaped half shells by means of a die pressing operation, both the male and female portions of the die being of a shape conforming to the outline of the blanks, the male portion being smaller than the female portion, and spaced apart in a manner to form an arcuate half shell from the blank which is of constant thickness throughout its length, placing one of the resultant arcuate right half shells in contact with a complementary arcuate left half shell so that their edges are in conforming contact each with the other, welding said half shells together along their edges to form a curved tube of equal thickness throughout its entire area, cutting a second set of curved right and left blanks from a sheet of metal having an outline conforming exactly with the first set of blanks but larger in width than the first set of blanks so that said second set of arcuate half shell members when formed are adapted to surround the curved tube formed from the first and smaller half shell members, forming two larger half shells from said second set of blanks conforming to the shape and contour of said first named half shells, placing a right and left pair of the larger second formed blanks around the first formed curved tube in a manner surrounding it and welding the edges of the second set of larger blanks together to form a larger second curved tube exactly conforming to the shape of the first tube and surrounding the first tube and welding the outer edges of both the first formed inner tube and the second formed outer tube to a pair of external mounting flanges in a manner whereby the annular space between the inner and outer will be of substantially uniform size throughout their length.

References Cited by the Examiner

UNITED STATES PATENTS

| | | | |
|---|---|---|---|
| 176,835 | 5/76 | Carson. | |
| 702,125 | 6/02 | Buckley. | |
| 799,013 | 9/05 | Moffitt | 60—30 |
| 900,576 | 10/08 | Nelson et al. | 115—13 |
| 1,440,658 | 1/23 | Coapman | 29—463 |
| 1,678,744 | 7/28 | Olsen. | |
| 2,228,637 | 1/41 | Mercier | 60—31 |
| 2,335,887 | 12/43 | Smith. | |
| 2,522,883 | 9/50 | MacArthur | 115—.5 |
| 2,568,512 | 9/51 | Reilly et al. | 29—463 |
| 2,650,180 | 8/53 | Walker | 285—179 X |
| 2,858,667 | 11/58 | Reske | 60—31 |

WHITMORE A. WILTZ, *Primary Examiner.*

ROBERT R. BUNEVICH, CHARLIE T. MOON,
*Examiners.*